(12) United States Patent
Griffin et al.

(10) Patent No.: US 8,929,718 B2
(45) Date of Patent: Jan. 6, 2015

(54) SYSTEMS AND METHODS FOR PROVIDING ONLINE ADVERTISEMENTS

(75) Inventors: Brian Griffin, Brooklyn, NY (US); Glenn Goldstein, Brooklyn, NY (US); Brian Huss, Brooklyn, NY (US); Colleen Fahey Rush, Port Washington, NY (US)

(73) Assignee: Viacom International Inc., New York, NY (US)

( * ) Notice: Subject to any disclaimer, the term of this patent is extended or adjusted under 35 U.S.C. 154(b) by 235 days.

(21) Appl. No.: 13/232,302

(22) Filed: Sep. 14, 2011

(65) Prior Publication Data

US 2013/0064524 A1    Mar. 14, 2013

(51) Int. Cl.

| | |
|---|---|
| H04N 9/80 | (2006.01) |
| H04N 21/81 | (2011.01) |
| H04N 21/239 | (2011.01) |
| H04N 21/24 | (2011.01) |
| H04N 21/258 | (2011.01) |
| H04N 21/472 | (2011.01) |
| H04N 21/6587 | (2011.01) |

(52) U.S. Cl.
CPC ......... H04N 21/812 (2013.01); H04N 21/2393 (2013.01); H04N 21/2407 (2013.01); H04N 21/25866 (2013.01); H04N 21/47202 (2013.01); H04N 21/6587 (2013.01)
USPC ................ 386/262; 386/343; 725/14; 725/42

(58) Field of Classification Search
CPC .......... H04N 21/2393; H04N 21/2407; H04N 21/812; H04N 21/47202; H04N 21/6587; H04N 21/25866
See application file for complete search history.

(56) References Cited

U.S. PATENT DOCUMENTS

| | | | |
|---|---|---|---|
| 2003/0192060 A1* | 10/2003 | Levy | 725/133 |
| 2004/0025174 A1* | 2/2004 | Cerrato | 725/9 |
| 2006/0031892 A1* | 2/2006 | Cohen | 725/88 |
| 2006/0070095 A1* | 3/2006 | Newton et al. | 725/27 |
| 2006/0085816 A1* | 4/2006 | Funk et al. | 725/34 |
| 2006/0287956 A1* | 12/2006 | Higashi et al. | 705/51 |
| 2007/0150919 A1* | 6/2007 | Morishita | 725/35 |
| 2008/0101763 A1* | 5/2008 | Bhogal et al. | 386/83 |
| 2010/0138853 A1* | 6/2010 | Tanaka | 725/23 |
| 2010/0269130 A1* | 10/2010 | Gupta | 725/28 |
| 2011/0219402 A1* | 9/2011 | Candelore et al. | 725/34 |
| 2011/0274410 A1* | 11/2011 | Haot et al. | 386/250 |

* cited by examiner

*Primary Examiner* — Thai Tran
*Assistant Examiner* — Stephen Smith
(74) *Attorney, Agent, or Firm* — Fay Kaplun & Marcin, LLP

(57) ABSTRACT

A computer-implemented method for providing online advertising is provided. The method includes providing, by a video delivery module, online video content to a user and maintaining, by a tracking module, a content consumption counter tracking an amount of time the user has watched the video content. The method also includes preventing, by a blocking module, the user from controlling playback of the video content if the content consumption counter satisfies a time characteristic. The method further includes providing, by an advertisement delivery module, a portion of an advertisement section to the user during the preventing. The duration of the portion of the advertisement section is dependent on the time characteristic.

18 Claims, 8 Drawing Sheets

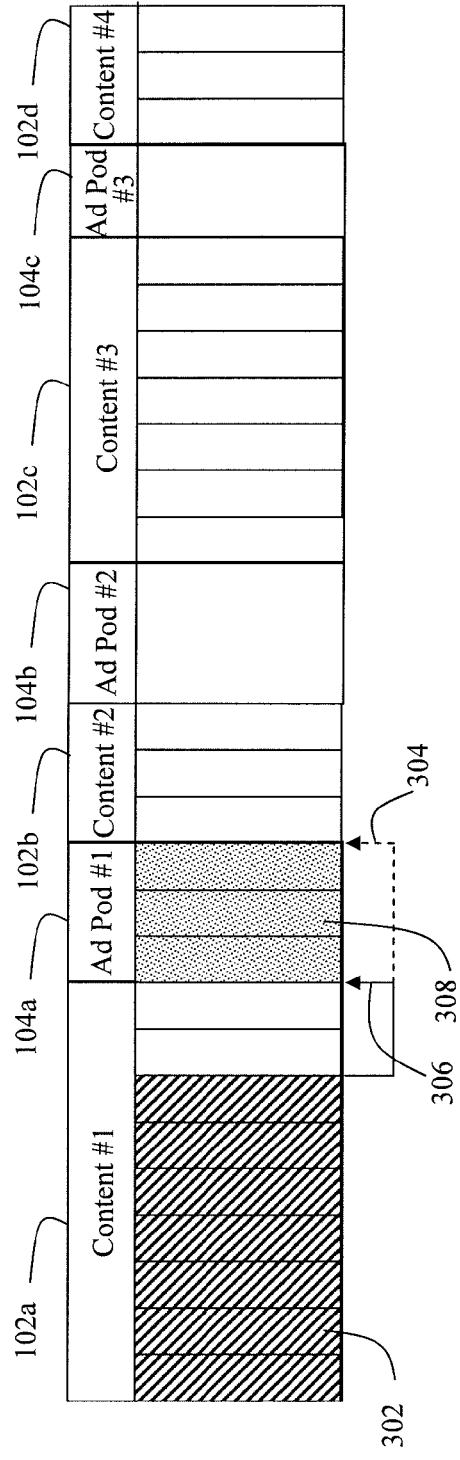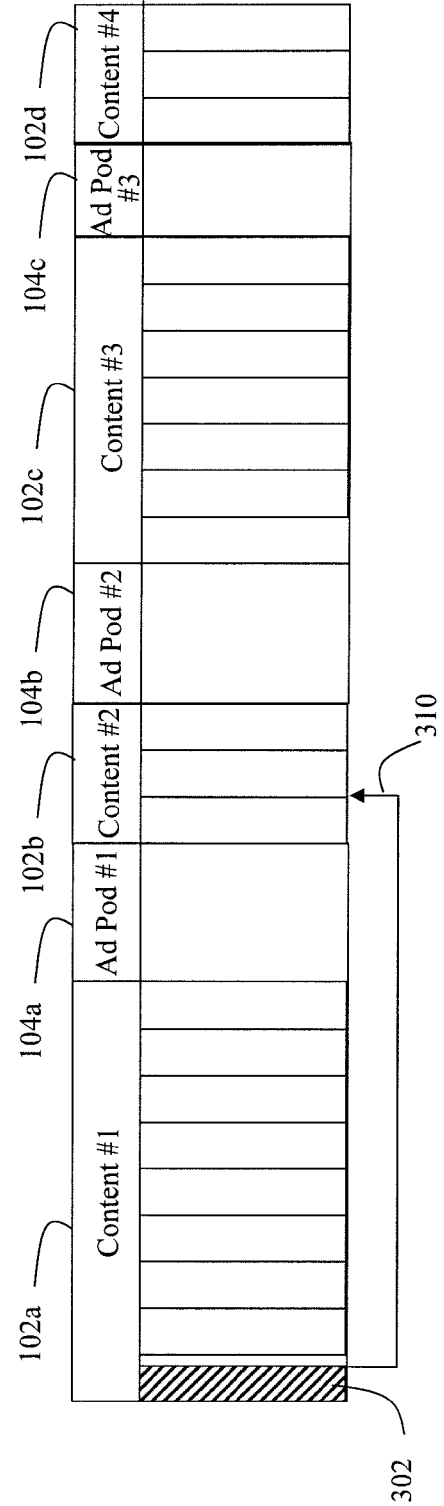

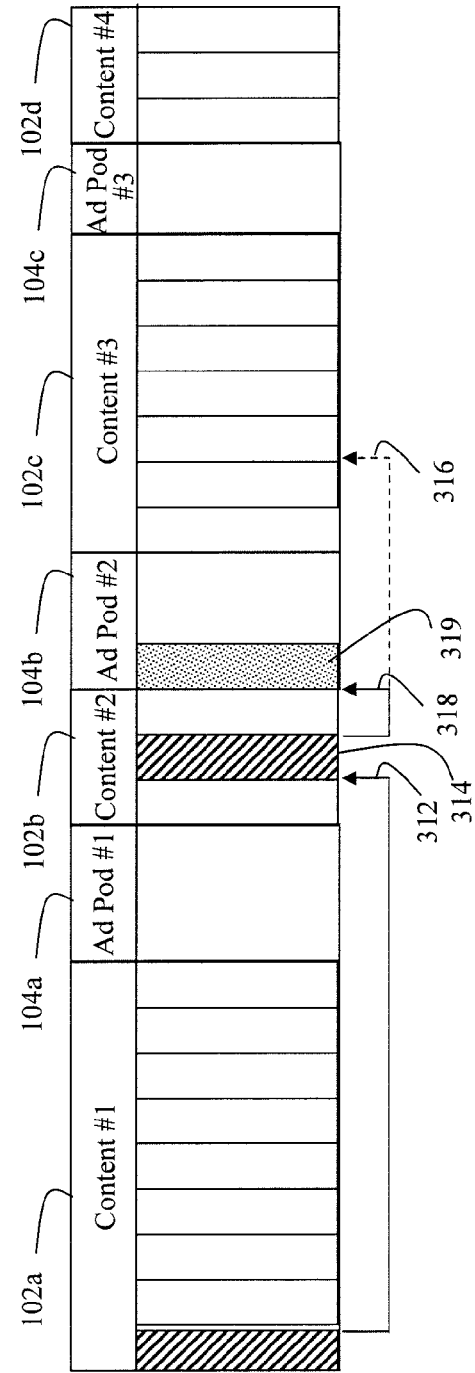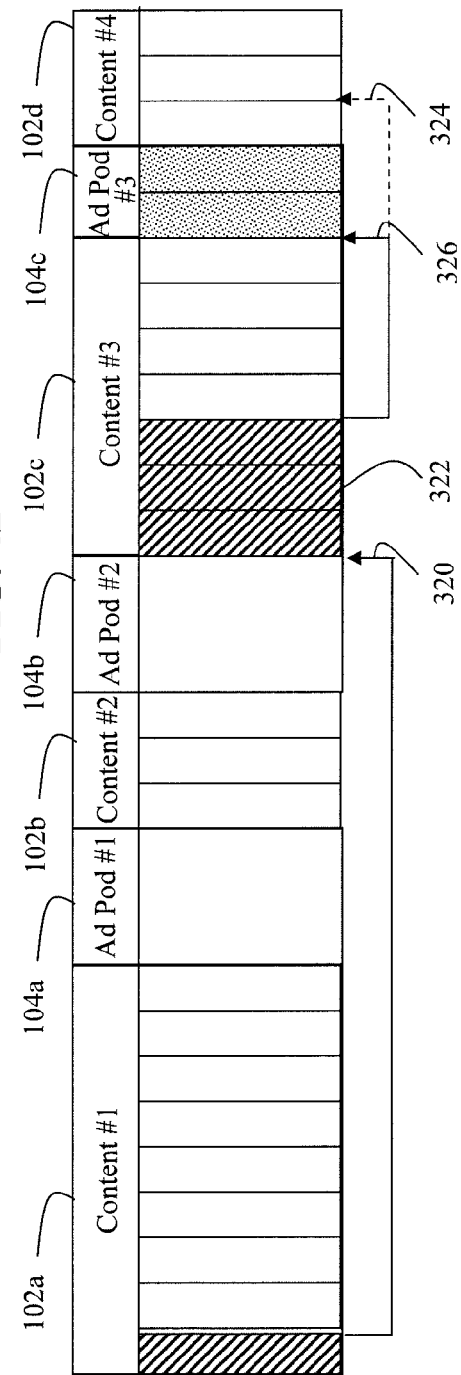

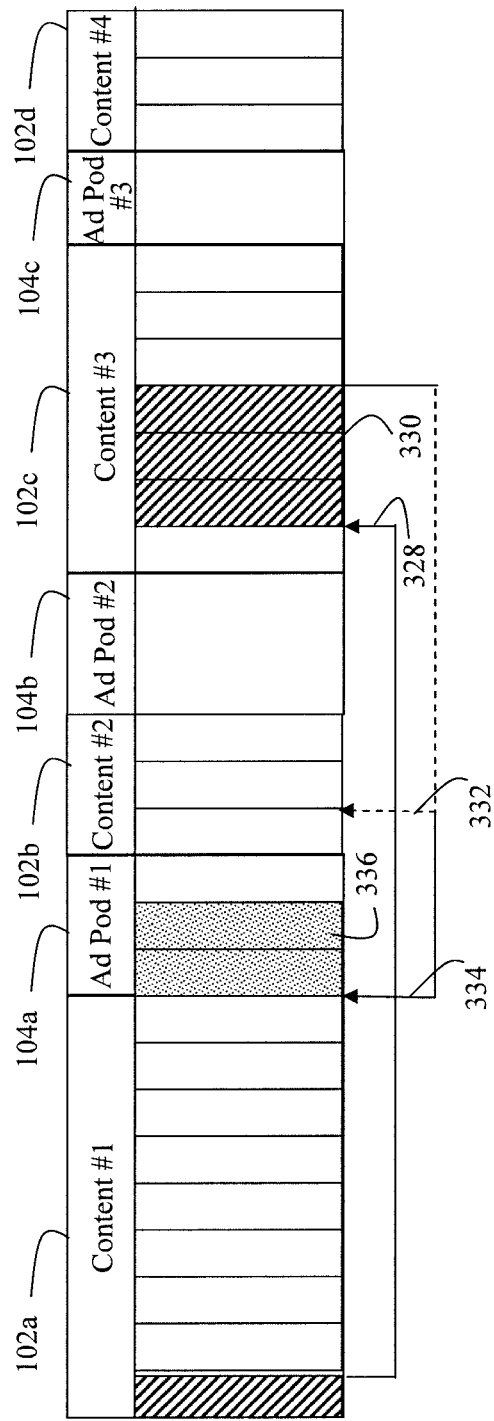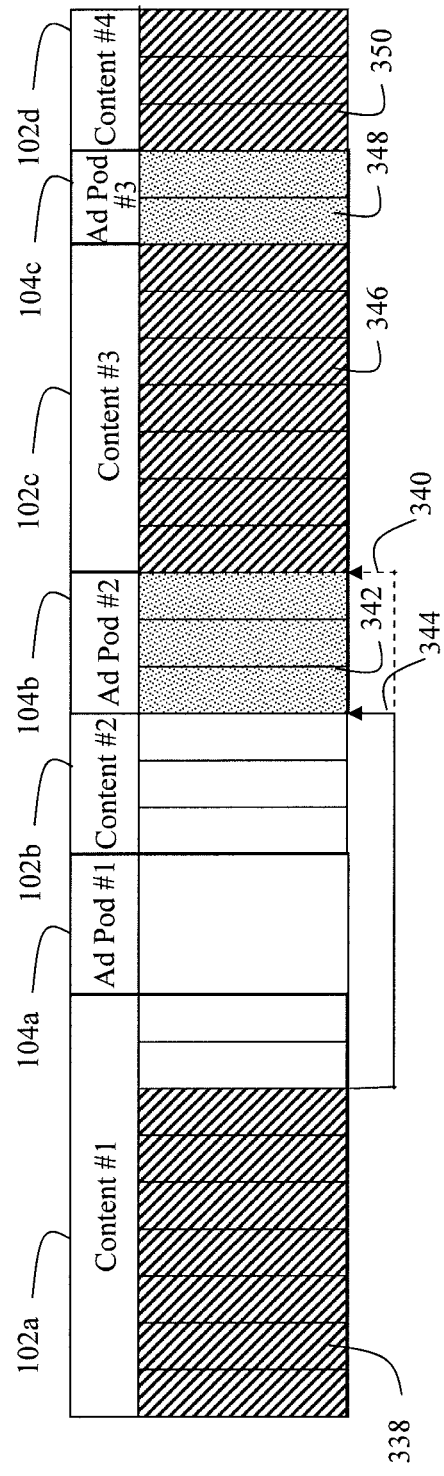

SYSTEMS AND METHODS FOR PROVIDING ONLINE ADVERTISEMENTS

FIELD OF THE INVENTION

The technology generally relates to systems and methods for providing online advertisements, and more particularly, to controlling playback of advertisements in an online program.

BACKGROUND OF THE INVENTION

In typical network broadcasting, about eight minutes of advertisements are included in a thirty-minute program, representing a ratio of content to advertisements of about 3 to 1. In addition, each advertisement break in a full-length program lasts at most 90 seconds, usually between 30 seconds to 60 seconds. For online content viewing, however, it has been found that viewers tend to tolerate longer advertisement breaks. Online viewing patterns are also different than broadcast viewing patterns. For example, online users can instantly jump to a new program section during playback, while users of even Digital Video Recorders (DVR) require more time to skip to a different section of a program.

In general, it is advantageous to maximize advertising time in a program because it enhances values to advertisers and increases revenue to broadcasters. To measure the value of advertisements, the Nielson's rating system provides the C3 ratings, which is a metric that rates average commercial minutes in live broadcast programming plus three days of online playback of the program after live broadcasting. To comply with the C3 rating system, a program provider can encode Nielsen audio watermarks in each program file formatted for online viewing.

SUMMARY OF THE INVENTION

Because advertising in online content is valuable to both advertisers and broadcasters, systems and methods are needed to strategically determine the frequency and duration of online advertisement playback so as to maximize c3 credits while ensuring that an online viewer is engaged with the content.

In one aspect, the invention features a computer-implemented method for providing online advertising. The method includes providing, by a video delivery module, online video content to a user and maintaining, by a tracking module, a content consumption counter tracking an amount of time the user has watched the video content. The method also includes preventing, by a blocking module, the user from controlling playback of the video content if the content consumption counter satisfies a time characteristic. The method further includes providing, by an advertisement delivery module, a portion of an advertisement section to the user during the preventing step. The duration of the portion of the advertisement section is dependent on the time characteristic. In some embodiments, the method additionally includes resetting the content consumption counter when the portion of the advertisement section has been viewed by the user. In some embodiments, the video content includes multiple video content sections interspersed among multiple advertisement sections in a schedule lineup.

In another aspect, the invention features a computer-implemented method for providing online advertising. The method includes providing, by a video delivery module, online video content to a user. The video content includes multiple video content sections interspersed among multiple advertisement sections in a schedule lineup. The method also includes maintaining, by a tracking module, a content consumption counter tracking an amount of time the user has watched the video content. The method further includes receiving, by a receiver module, an input from the user to advance from a current video content section to a next video content section. The method includes providing, by an advertisement delivery module, at least a portion of an advertisement section to the user before advancing to the next video content section if the content consumption counter satisfies a time characteristic. The duration of the portion of the advertisement section is dependent on the time characteristic. The tracking module is adapted to reset the content consumption counter when the advertisement section has been viewed by the user. In some embodiments, the method further includes preventing the user from advancing to the next video content section when the advertisement section is being provided to the user.

In yet another aspect, the invention features a computer program product, tangibly embodied in a non-transitory computer readable medium for playing online advertising. The computer program product includes instructions being operable to cause data processing apparatus to provide online video content to a user and maintain a content consumption counter tracking an amount of time the user has watched the video content. In addition, the computer program product includes instructions being operable to cause data processing apparatus to prevent the user from controlling playback of the video content if the content consumption counter satisfies a time characteristic and provide at least a portion of an advertisement section to the user during the preventing step. The duration of the at least a portion of the advertisement section is dependent on the time characteristic.

In other examples, any of the aspects above can include one or more of the following features. In some embodiments, the user is prevented from moving from a current video section to a next video section if the content consumption counter satisfies the time characteristic. The advertisement section served can be immediately before the next video content section in a schedule lineup.

In some embodiments, the content consumption counter tracks a cumulative amount of time the user has watched the video over the multiple video content sections.

In some embodiments, the user is allowed to control playback of the video content if the content consumption counter is less than 60 seconds, such as allowing the user to move to another video content section or advertisement section. In some embodiments, if the time characteristic includes 60 to 179 seconds of video content viewing time, the duration of the portion of the advertisement section served is 60 seconds. In some embodiments, if the time characteristic includes 180 to 359 seconds of video content viewing time, the duration of the portion of the advertisement section served is 120 seconds. In some embodiments, if the time characteristic includes greater than 360 seconds of video content viewing time, the duration of the portion of the advertisement section served is 180 seconds.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

FIGS. 4A-F show examples illustrating the playback control technology of the present invention.

DETAILED DESCRIPTION OF THE INVENTION

Figure 1:
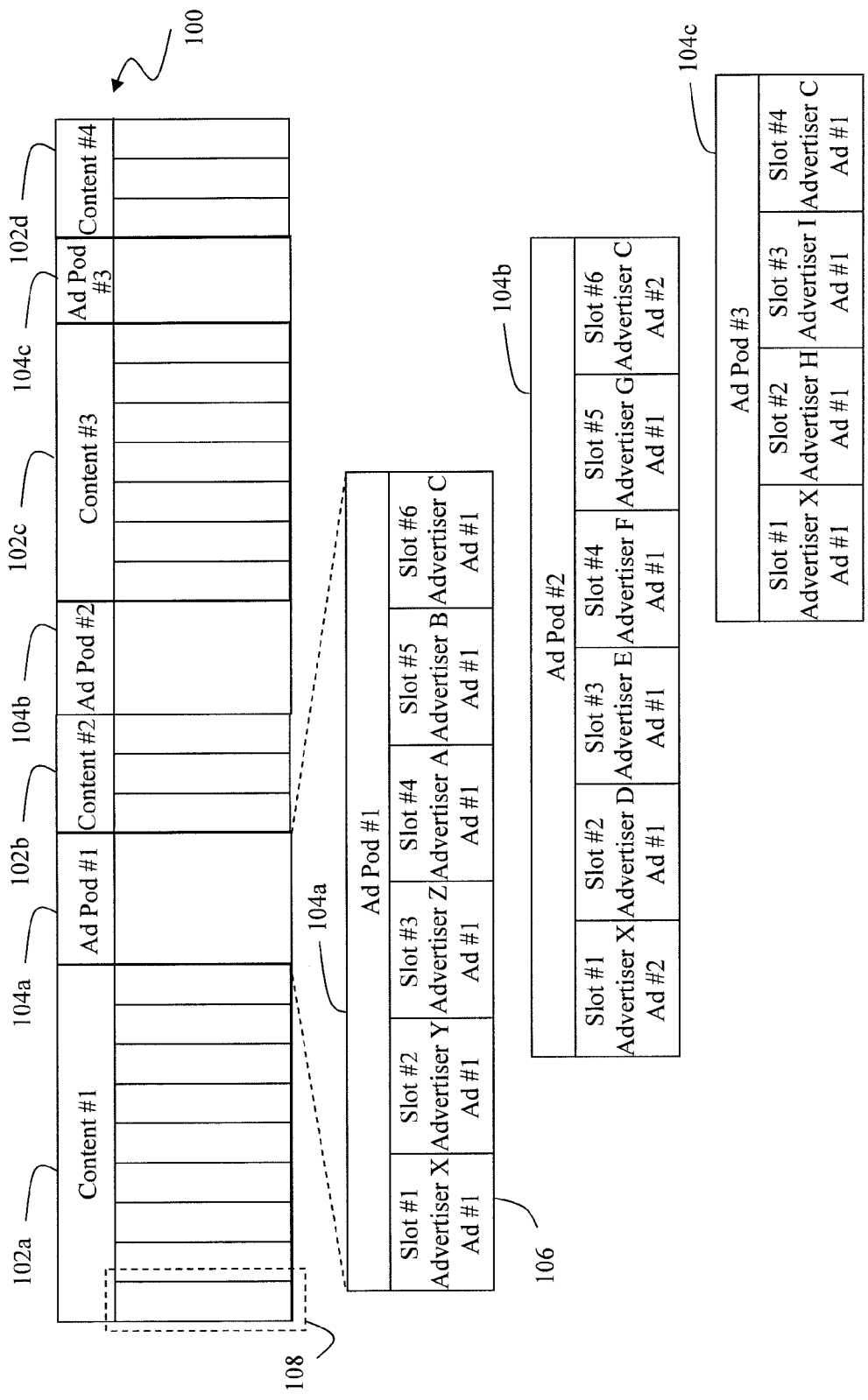
FIG. 1 shows an illustrative online program including advertisements and video content.

FIG. 1 shows an exemplary online program including advertisements and video content. For purposes of illustration, the length of the program 100 is thirty minutes, including twenty-two minutes of online video content 102 and eight minutes of online advertisements 104. The video content 102 can be divided into sections, such as content sections 102a, 102b, 102c, and 102d, which are interspersed among advertisement sections 104a, 104b and 104c.

The content sections 102a, 102b and 102c can have varying durations. For purposes of illustration, a block 108 in the program 100 represents one minute of online video content programming. Therefore, the content section 102a includes nine minutes of video content, the content section 102b includes three minutes of video content, the content section 102c includes seven minutes of video content and the content section 102d includes three minutes of video content.

The advertisement sections 104a, 104b and 104c can also have varying durations. As shown, the advertisement section 104a is three minutes in duration and includes six advertisement slots 106, with each slot 106 thirty seconds in duration. In some embodiments, the slots 106 are sponsored by different advertisers. The advertisement section 104b is also three minutes in duration, and the advertisement section 104c is two minutes in duration.

In some embodiments, to capture c3 ratings, Nielsen audio watermarks are first encoded into the video feed of broadcast content and advertisements. The file is then transcoded into a format suitable for online viewing with the Nielsen audio watermarks intact. The file can be uploaded to a distributor's video management system and published to an online video player or website for time-shifted viewing. A unique audio watermark is assigned to every few seconds of the broadcasted program. A watermark can include information identifying the origin of the content, such as the name of the channel that originally broadcasted the content as well as the date and time of the broadcast. For example, "Slot #1" in the advertisement section 104a can have a different Nielsen audio watermark than the same creative that runs in the advertisement section 104c under "Slot #1."

Figure 2:
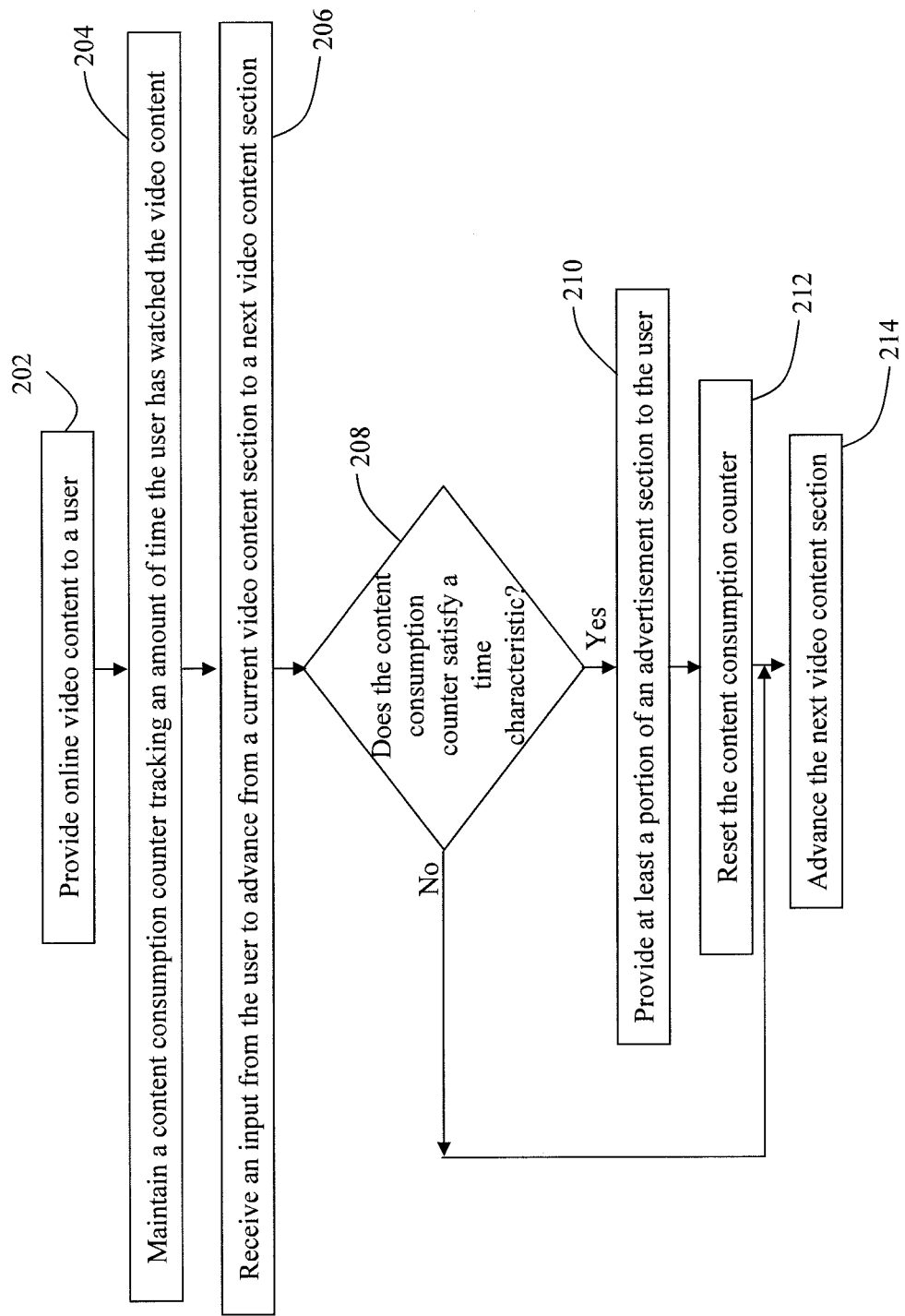
FIG. 2 shows an exemplary process for controlling playback of advertisements in an online program.

FIG. 2 shows an exemplary process for controlling playback of advertisements in an online program. The process starts when an online program is provided to a viewer (step 202), such as the program 100 of FIG. 1, which includes one or more video content sections 102 and one or more advertisement sections 104. Upon the start of playback, a content consumption counter begins to track the amount of time the viewer has watched the video content portion 102 of the program 100 (step 204). In addition, the viewer's attempt to control playback of the online video content, such as skipping from a current frame to a next frame, is monitored (step 206). The next frame selected by the viewer can be ahead of the current frame or behind the current frame in the program schedule 100. In addition, the next content frame can be in a video content section 102 or an advertisement section 104.

Upon receiving an input from the viewer to skip to a different frame, the process determines an appropriate course of action based on whether the content consumption counter satisfies a time characteristic (step 208). If the time characteristic is satisfied, a minimum advertisement viewing (MAV) time is computed and at least a portion of an advertisement section 104 having the MAV time is provided to the viewer (step 210). While the advertisement portion is being presented, the viewer is prevented from controlling the playback, such as skipping to another frame without watching the advertisement or fast-forwarding through the advertisement. Only after the MAV time has elapsed does the viewer gain playback control (step 214). In some embodiments, if the MAV time is less than the duration of the entire advertisement section 104, that is, if the viewer is only provided with a portion of the advertisement section 104, playback control simply becomes active after the MAV time has elapsed. The viewer needs to recognize the change in control status and manually skips to the desired frame. Alternatively, playback can automatically resume from the viewer-selected frame. In some embodiments, if the MAV time is equal to or greater than the full-length of the advertisement section 104, the advertisement section 104 is played back to the viewer in its entirety, after which playback automatically resumes from the viewer-selected frame. In addition, after a viewer has consumed the MAV-time worth of advertisement, the content consumption counter is reset (step 212).

However, if the content consumption counter does not satisfy the time characteristic, playback skips to the user-selected frame without playing any advertisement to the viewer (step 214). The content consumption counter continues to track the cumulative time the viewer has viewed the video content portion 102 of the program 100. For example, assuming that the threshold for triggering advertisement playback is 60 seconds of video content viewing time, if a viewer consumes 10 seconds of the advertisement content 104a, 40 seconds of the advertisement content 104c, followed by 5 seconds of the advertisement content 104b, the content consumption counter becomes 55 seconds and the content consumption counter is not reset, but continues to track the viewer's cumulative content-viewing time.

In some embodiments, the advertisement section 104 presented to the viewer is the advertisement section that immediately precedes the next frame the viewer chooses to advance to. For example, if the viewer is currently viewing a frame in the video content section 102a and chooses to skip to a frame in the video content section 102d, and the viewer has watched a sufficient amount of the video content to satisfy the time characteristic, then at least a portion of the advertisement section 104c is played back to the viewer. In general, the advertisement section 104 presented to the viewer upon satisfying a content-viewing time characteristic can be any advertisement section 104 scheduled for the program 100. For example, the advertisement section 104 presented can be immediately after the desired content frame the viewer chooses to advance to. In some instances, the advertisement section 104 is randomly selected among all the advertisement sections.

In some embodiments, the MAV time is dependent on the time characteristic, which includes one or more video content consumption ranges. According to one exemplary set of MAV rules, if the content consumption counter is greater than or equal to 60 seconds, but less than or equal to 179 seconds, the MAV time is 60 seconds minimum. This means that if the viewer has continuously watched 60 to 179 seconds of video content, a minimum of 60 seconds worth of advertisement is played back to the viewer. In addition, if the content consumption counter is greater than or equal to 180 seconds, but less than or equal to 359 seconds, the MAV time is 120 seconds minimum. Furthermore, if the content consumption counter is greater than or equal to 360 seconds, the MAV time is 180 seconds minimum, which may be the full length of an advertisement section 104. However, if the content consumption counter is less than or equal to 59 seconds, the MAV time is zero. This means that no advertisement is shown to the viewer before allowing the viewer to skip to the desired content.

In general, the MAV rules can be such that if the viewer has watched more than 60 seconds of the video content 102, the viewer needs to watch at least 60 seconds of the advertisements 104, during which viewer control is blocked. The reason that at least 60 seconds of advertisement is played back at once is that each C3 credit in the Nielsen rating system requires at least one minute of advertisement consumption. However, other minimum viewing time can be implemented, such as 30 seconds, 90 seconds, etc.

The time characteristic and the MAV time can be variable. For example, in a thirty-minute program, if there are twenty-two minutes of video content and eight minutes of advertisements, the ratio of content-to-advertisement is about 3:1. Therefore, a set of rules can be developed such that for every three minutes of content viewing, the viewer needs to be served at minimum one minute of advertisements. The time characteristic and the MAV time can also be set based on other content-to-advertisement ratios such as 4:1 or 2:1. In some embodiments, the time characteristic and the MAV time are user configurable. For example, the values can be configured client-side by the online content distributor. The values can also be configured server-side by the broadcaster of the original program.

Figure 3:
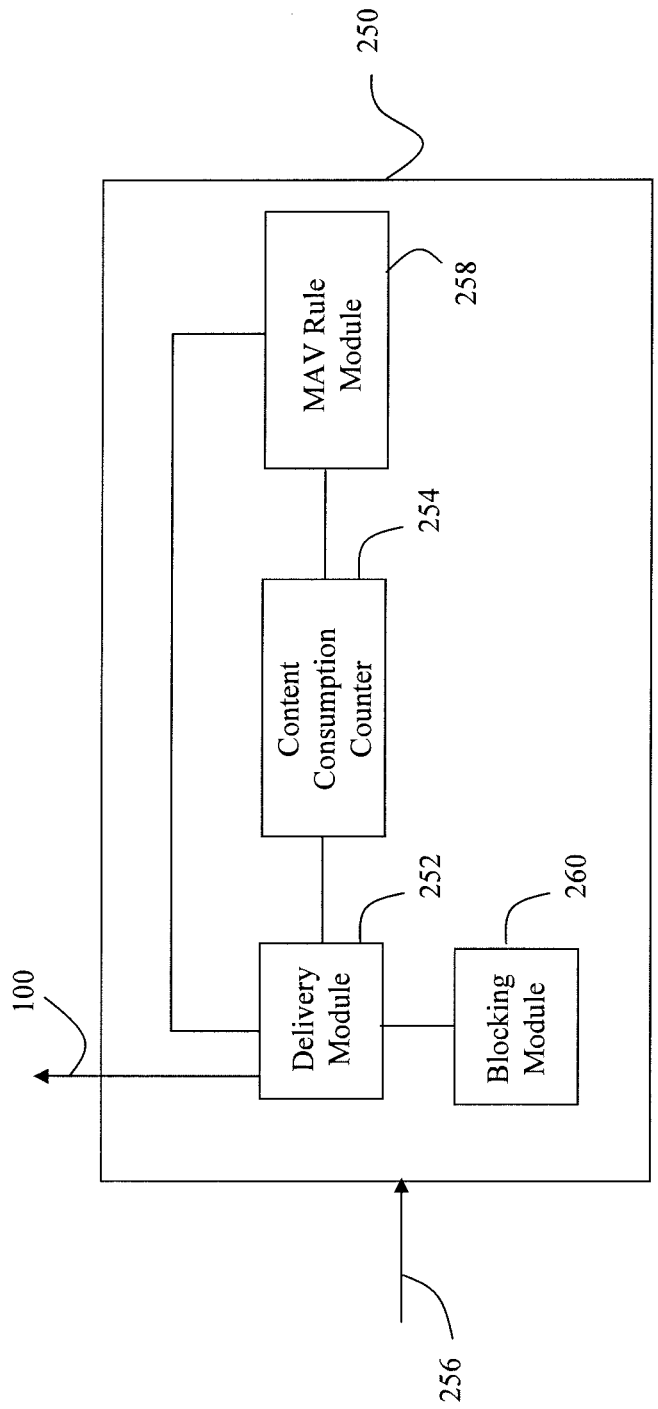
FIG. 3 shows an exemplary system configured to control playback of advertisements in an online program.

FIG. 3 shows an exemplary system 250 configured to control playback of advertisements in an online program, such as the online program 100. The system 250 includes a delivery module 252 for delivering the online program 100 to a viewer. The online program 100 can include one or more video content sections 102 interspersed among one or more advertisement sections 104. In some embodiments, the delivery module 252 includes a video delivery module (not shown) for delivering the video content portion 102 of the program 100 and an advertisement delivery module (not shown) for delivering the advertisement portion 104 of the program 100.

The delivery module 252 can deliver the online program 100 to a variety of computing devices, including, but are not limited to, personal computers, server computers, portable computers, laptop computers, personal players, personal digital assistants (PDAs), cellular telephones, e-mail clients, tablets, televisions and game consoles. In addition, the online program 100 can be displayed in a variety of user interfaces, including, but not limited to, mouse interfaces, touch interfaces, dpad (4-way) interfaces.

The system 250 also includes a content consumption counter 254 that monitors program playback by the delivery module 252 to track an amount of time the viewer has watched the video content of the program 100. In addition, a MAV rule module 258 is provided that, upon detecting a viewer input 256 to control the playback, determines whether at least a portion of an advertisement section needs to be shown to the viewer. The MAV rule module 258 makes such a determination based on the content consumption counter 254 and one or more rules stored in the system 250. If the MAV rule module 258 determines that the content consumption counter 254 satisfies a MAV rule, the MAV rule module 258 determines a MAV time for playing an advertisement section and supplies the MAV time to the delivery module 252.

The delivery module 252, upon receiving the MAV time, selects an advertisement section 104 and presents to the viewer at least a portion of the advertisement section 104 having the MAV duration set by the MAV rule module 258. In addition, the delivery module 252 can interact with the blocking module 260 to prevent the viewer from controlling the playback while the MAV-portion of the advertisement section is being shown. Thereafter, the delivery module 252 can reset the content consumption counter 254 and unblock viewer control by interacting with the blocking module 260.

In some embodiments, if only a portion of an advertisement section 104 is provided to the viewer, the delivery module 265 needs to crop the advertisement section 104 while capturing sufficient information to receive c3 ratings for the portion presented to the viewer. For example, when cropping an advertisement section 104, the delivery module 265 captures the following information: name of the channel that originally broadcasted the advertisement section 104, franchise, episode, original air date, advertisement section number, advertisement section duration, location of the slot 106 within the advertisement section 104, advertiser identity and/or advertisement identification.

FIGS. 4A-F show various examples illustrating the playback control technology of the present invention. For all the examples, the following rules for selecting the MAV time are provided: if the content consumption counter is between 60 and 179 seconds, the MAV time is 60 seconds minimum; if the content consumption counter is between 180 and 359 seconds, the MAV time is 120 seconds minimum; and if the content consumption counter is above 359 seconds, the MAV time is 180 seconds minimum.

According to the example shown in FIG. 4A, a viewer watches seven minutes (420 seconds) of the video content section 102a, the duration which, for the purposes of illustration, is represented by the shaded region 302. Then, the viewer attempts to jump to the beginning of the video content section 102b, as indicated by the position arrow 304. At this point, the content consumption counter is 420 seconds. Therefore, according to the MAV rules, the viewer is required to watch 180 seconds of the advertisement section 104a, which is the full length of the advertisement section 104a, as represented by the shaded area 308. Hence, playback skips to the beginning of the advertisement section 104a, as indicated by the position arrow 306. The advertisement section 104a is selected for playback to the viewer because it immediately precedes the viewer-selected content section 102b. After watching the advertisement section 104a, the viewer can be automatically redirected to the beginning of the desired content section 102b at the position 304. In addition, the content consumption counter can be reset.

According to the example shown in FIG. 4B, a viewer watches less than 60 seconds of the video content section 102a. Then the viewer attempts to skip to the middle of the video content section 102b, as indicated by the position arrow 310. In this instance, according to the MAV rules, the viewer is not required to watch any advertisements because the content consumption counter is less than 60 seconds. Therefore, the viewer immediately skips to the desired content section 102b at the position 310. In this case, the content consumption counter is not reset.

According to the example shown in FIG. 4C, a viewer watches less than 60 seconds of the video content section 102a and then jumps to the middle of the video content section 102b, as indicated by the position arrow 312. Similar to the example shown in FIG. 4B, because the content consumption counter is less than 60 seconds, the viewer is allowed to skip to the desired frame indicated by the position arrow 312 without being required to watch any advertisement. The viewer then watches another minute (60 seconds) of the content section 102b, the duration of which is represented by the shaded area 314. Thereafter, the viewer attempts to jump to the middle of the content section 102c, as indicated by the position arrow 316. However, because the content consumption counter at this point is greater than 60 seconds, but less than 180 seconds, the viewer is required to watch at least 60 seconds of the advertisement section 104b that precedes the desired video content 102c. Hence, playback starts at the beginning of the advertisement section 104b, as indicated by the position arrow 318, instead of at position 316.

In some embodiments, the viewer is prevented from controlling the playback until he has watched the 60 seconds worth of the advertisement section 104b, as represented by the shaded area 319. In some embodiments, after the viewer has watched the requisite amount of advertisement 319, the control is unblocked. The viewer can skip to another frame in the program 100, including to a different position in the same advertisement section 104b, to a different advertisement section, or to a video content section. In general, the viewer may not be automatically redirected to the previously-selected position 316 in the content section 102c.

According to the example shown in FIG. 4D, a viewer watches less than 60 seconds of the video content section 102a and then jumps to the beginning of the video content section 102c, as indicated by the position arrow 320. Because the content consumption counter at this point is less than 60 seconds, the viewer is allowed to skip to the position 320 without being required to watch any advertisement. The viewer then watches another three minutes (180 seconds) of the content section 102c, the duration of which is represented by the shaded area 322. Thereafter, the viewer attempts to jump to the middle of the content section 102d, as indicated by the position arrow 324. However, because the content consumption counter at this point is greater than 180 seconds, but less than 360 seconds, the viewer is required to watch at least 120 seconds of the advertisement section 104c that precedes the desired video content 102d. Hence, playback starts at the beginning of the advertisement section 104c, as indicated by the position arrow 326, instead of at position 324. In some embodiments, after the viewer has watched the 120 seconds worth of the advertisement section 104c, which is the full-length of the advertisement represented by the shaded area 328, playback automatically resumes at the desired position 324. Alternatively, the viewer has the freedom of choosing the next position to watch the program.

According to the example shown in FIG. 4E, a viewer watches less than 60 seconds of the video content section 102a and then jumps to the middle of the video content section 102c, as indicated by the position arrow 328. Because the content consumption counter at this point is less than 60 seconds, the viewer is allowed to skip to the position 328 without being required to watch any advertisement. The viewer then watches another three minutes (180 seconds) of the content section, the duration of which is represented by the shaded area 330. Thereafter, the viewer attempts to skip backward to the middle of the content section 102b, as indicated by the position arrow 332. However, because the content consumption counter at this point is greater than 180 seconds, but less than 360 seconds, the viewer is required to watch at least 120 seconds of the advertisement section 104a that precedes the desired video content 102b. Hence, playback starts at the beginning of the advertisement section 104a, as indicated by the position arrow 334, instead of at position 332.

During the playback of the 120 seconds worth of the advertisement section 104a, which is represented by the shaded region 336, the viewer is prevented from controlling the playback, such as fast-forwarding through the advertisement portion 336 or skipping the portion 336 altogether. Playback control is only active after the viewer has finished watching the advertisement portion 336. Thereafter, the viewer can manually move to a desired position. However, if no input is received from the viewer, playback continues with the remaining portion of the advertisement section 104a. Alternatively, after the advertisement portion 336 is shown to the viewer, playback automatically skips to the desired content position 332 without any additional input from the viewer.

According to the example shown in FIG. 4F, a viewer watches seven minutes (420 seconds) of the video content section 102a, the duration which is represented by the shaded region 338. Then, the viewer attempts to jump to the beginning of the video content section 102c, as indicated by the position arrow 340. However, because the content consumption counter at this point is 420 seconds, which is greater than 360 seconds, the viewer is required to watch 180 seconds of the advertisement section 104b, as represented by the shaded area 342. Hence, playback skips to the beginning of the advertisement section 104b, as indicated by the position arrow 344. Thereafter, the viewer can be automatically redirected to the beginning of the video content section 102c at the position 340. In addition, the content consumption counter is reset.

After the viewer watches the content section 102c in its entirety, as represented by the shaded area 346, the viewer is required to watch all of the advertisement section 104c because the content consumption counter is now 420 seconds, which is greater than 360 seconds. After the viewer has watched the advertisement section 104c, the duration of which is represented by the shaded area 348, the content consumption counter is reset again. At this point, if the viewer proceeds to watch the content section 102d in its entirety, which is represented by the shaded area 350, the content consumption counter becomes 180 seconds.

In some embodiments, if the viewer skips backward to re-watch a part of the content section 102c, since the content consumption counter is now 180 seconds, the viewer is required to watch at least 120 seconds of the advertisement section 104b that precedes the desired content section 102c.

In some embodiments, if the viewer skips backward to re-watch a part of the content section 102a, since there is no advertisement section that precedes the content section 102a, the viewer is allowed to watch the desired content without watching any advertisement, even though the content consumption counter is 180 seconds at the time of the jump. In some embodiments, even though there is no advertisement section that precedes the content section 102a, the viewer is presented with at least a portion of one of the advertisement sections 104a, 104b and 104c before being allowed to view the desired content.

Even though the present invention is described within the framework of Nielsen's C3 rating system, the technology described herein can be independently implemented without being tied to any rating systems while still maximizing values to advertisers. Therefore, to implement the present technology, it may not be necessary to encode the Nielsen watermarks into the online program 100.

Figure 5A:
FIGS. 5A and 5B show exemplary online interfaces when a viewer's control is blocked during playback of an advertisement.
Figure 5B:

FIGS. 5A and 5B show exemplary online interfaces when a viewer's control is blocked during playback of an advertisement. This situation occurs when, for example, the viewer's content consumption counter satisfies a time characteristic. As a result, at least a portion of an advertisement section needs to be played back to the viewer, the duration of which corresponds to a MAV time selected based on the time characteristic. FIG. 5A shows an exemplary interface 400 presenting an advertisement frame 402 to a viewer. In addition, the interface 400 can display a message 404 notifying the viewer that his control is blocked as well as including a countdown to the time he will regain control of the playback. FIG. 5B shows another exemplary interface 405, which can be a hover display. Similar to FIG. 5A, the hover display 405 can include an advertisement area 406 and a message area 408. During playback of the MAV-portion of the advertisement, the viewer cannot interact with the progress bar 410 of the hover display 405, such as skip to a different frame. For example, the progress bar 410 may be inactive until countdown in the message area 408 is completed.

Figure 6A:
FIGS. 6A and 6B show exemplary online interfaces when a viewer's control is unblocked during playback of an advertisement.
Figure 6B:

FIGS. 6A and 6B show exemplary online interfaces when a viewer's control is unblocked during playback of an advertisement. This situation occurs when, for example, the viewer has finished watching a portion of an advertisement section that satisfied the MAV time. The remaining portion of the advertisement section is now being shown to the viewer, but the viewer has playback control. FIG. 6A shows an exemplary interface 500 presenting an advertisement frame 502 to the viewer. In addition, the interface 500 can display a message 504 notifying the viewer that regular content programming will resume shortly. However, the viewer has the option of advancing to a different frame, either within the advertisement section or outside of the advertisement section. FIG. 6B shows another exemplary interface 505, which can be a hover display. Similar to FIG. 6A, the hover display 505 can include an advertisement area 506 and a message area 508. During playback of the advertisement, the viewer can interact with the progress bar 510 to skip to a different frame. For example, button 512 associated with the progress bar 510 allows a user to seek forward or backward during playback of the program content.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computer-implemented method for providing online advertising, the method comprising:
   providing, by a video delivery module, online video content to a user, the video content comprising a plurality of video content sections interspersed among a plurality of advertisement sections in a schedule lineup;
   maintaining, by a tracking module, a content consumption counter tracking an amount of time the user has watched the video content, the content consumption counter tracking a cumulative amount of time the user has watched the video content over at least two of the video content sections;
   preventing, by a blocking module, the user from controlling playback of the video content if the content consumption counter satisfies a time characteristic; and
   providing, by an advertisement delivery module, a portion of an advertisement section to the user during the preventing, wherein a duration of the portion of the advertisement section is dependent on the time characteristic.

2. The method of claim 1 wherein the preventing further comprises preventing the user from moving from a current video section to a next video section.

3. The method of claim 2 wherein the advertisement section is immediately before the next video content section in a schedule lineup.

4. The method of claim 1 further comprising resetting the content consumption counter when the portion of the advertisement section has been viewed by the user.

5. The method of claim 1 further comprising allowing the user to control playback of the video content if the content consumption counter is less than 60 seconds.

6. The method of claim 1 wherein allowing the user to control playback comprises allowing the user to move to another video content section or advertisement section.

7. The method of claim 1 wherein the time characteristic comprises 60 to 179 seconds of video content viewing time and the duration of the portion of the advertisement section is 60 seconds.

8. The method of claim 1 wherein the time characteristic comprises 180 to 359 seconds of video content viewing time and the duration of the portion of the advertisement section is 120 seconds.

9. The method of claim 1 wherein the time characteristic comprises greater than 360 seconds of video content viewing time and the duration of the portion of the advertisement section is 180 seconds.

10. A computer-implemented method for providing online advertising, the method comprising:
    providing, by a video delivery module, online video content to a user, the video content comprising a plurality of video content sections interspersed among a plurality of advertisement sections in a schedule lineup;
    maintaining, by a tracking module, a content consumption counter tracking an amount of time the user has watched the video content, the content consumption counter tracking a cumulative amount of time the user has watched the video content over at least two of the plurality of video content sections;
    receiving, by a receiver module, an input from the user to advance from a current video content section to a next video content section;
    providing, by an advertisement delivery module, at least a portion of an advertisement section to the user before advancing to the next video content section if the content consumption counter satisfies a time characteristic, wherein a duration of the portion of the advertisement section is dependent on the time characteristic; and
    resetting, by the tracking module, the content consumption counter when the advertisement section has been viewed by the user.

11. The method of claim 10 further comprising allowing the user to advance to the next video content section without providing the portion of the advertisement section if the content consumption counter is less than 60 seconds.

12. The method of claim 10 wherein the time characteristic comprises 60 to 179 seconds of video content viewing time and the duration of the portion of the advertisement section is 60 seconds.

13. The method of claim 10 wherein the time characteristic comprises 180 to 359 seconds of video content viewing time and the duration of the portion of the advertisement section is 120 seconds.

14. The method of claim 10 wherein the time characteristic comprises greater than 360 seconds of video content viewing time and the duration of the advertisement section is 180 seconds.

15. The method of claim 10 further comprising preventing the user from advancing to the next video content section when the advertisement section is being provided to the user.

16. The method of claim 10 wherein the advertisement section is immediately before the next video content section in the schedule lineup.

17. A system for providing online advertising, the system comprising:
- a video delivery module for providing online video content to a user, the video content comprising a plurality of video content sections interspersed among a plurality of advertisement sections in a schedule lineup;
- a content consumption counter for tracking an amount of time the user has watched the video content, the content consumption counter tracking a cumulative amount of time the user has watched the video content over at least two of the video content sections;
- a blocking module for preventing the user from controlling playback of the video content if the content consumption counter satisfies a time characteristic; and
- an advertisement delivery module for providing at least a portion of an advertisement section to the user during the preventing, wherein a duration of the at least a portion of the advertisement section is dependent on the time characteristic.

18. A computer program product, tangibly embodied in a non-transitory computer readable medium, for providing online advertising, the computer program product including instructions being operable to cause data processing apparatus to:
- provide online video content to a user, the video content comprising a plurality of video content sections interspersed among a plurality of advertisement sections in a schedule lineup;
- maintain a content consumption counter tracking an amount of time the user has watched the video content, the content consumption counter tracking a cumulative amount of time the user has watched the video content over at least two of the video content sections;
- prevent the user from controlling playback of the video content if the content consumption counter satisfies a time characteristic; and
- provide at least a portion of an advertisement section to the user during the preventing, wherein a duration of the at least a portion of the advertisement section is dependent on the time characteristic.

* * * * *